United States Patent [19]

Dempster et al.

[11] Patent Number: 5,300,356

[45] Date of Patent: Apr. 5, 1994

[54] TAPE COATING

[75] Inventors: William Dempster, Nashua, N.H.;
Jordan D. Kellner, Wayland, Mass.;
Jerry M. Serra, Chelmsford, Mass.;
Leonard D. DeCoste, Stoneham, Mass.

[73] Assignee: The Kendall Company, Mansfield, Mass.

[21] Appl. No.: 921,670

[22] Filed: Jul. 30, 1992

Related U.S. Application Data

[63] Continuation-in-part of Ser. No. 699,052, May 13, 1991, abandoned, and a continuation-in-part of Ser. No. 546,471, Jun. 28, 1990, abandoned, which is a continuation-in-part of Ser. No. 403,416, Sep. 6, 1989, abandoned.

[51] Int. Cl.$^5$ .................................................. C09J 7/02
[52] U.S. Cl. .................................... 428/220; 428/346; 428/349; 428/351; 428/353; 428/354; 156/188; 156/190
[58] Field of Search .............. 428/343, 346, 349, 351, 428/354, 355, 353, 36.91; 156/188, 189, 190, 195

[56] References Cited

U.S. PATENT DOCUMENTS

| | | | |
|---|---|---|---|
| 3,294,609 | 12/1966 | Foll | 156/190 |
| 3,524,779 | 8/1970 | Masters | 156/190 |
| 3,525,656 | 8/1970 | Kennedy | 156/188 |
| 3,616,006 | 10/1971 | Landgraf | 156/188 |
| 3,700,520 | 10/1972 | Hielema | 156/188 |
| 4,211,595 | 7/1980 | Samour | 156/190 |

Primary Examiner—Jenna L. Davis
Attorney, Agent, or Firm—Alvin Isaacs

[57] ABSTRACT

A tape wrap system adapted for protecting metal tubular articles, particularly pipes, from corrosion comprising in order, a primer coating covering the surface of the article, an innerwrap over the primer coating and an outerwrap placed over the innerwrap, the innerwrap comprising a polyolefin layer carrying an adhesive layer on its inner surface and a layer comprising a heat fusible material on its outer surface, or a single layer comprising a blend of a polyolefin and a heat fusible moiety carrying an adhesive layer on its inner surface, the outerwrap comprising an impact-resistant polyolefin layer having a heat fusible layer on both surfaces or the inner surface thereof, or a single layer comprising a blend of an impact resistant polyolefin and a heat fusible material; the tape wrap system fusing the innerwrap and outerwrap together when heated and thereafter cooled to form a uniform, continuous and completely closed protective coating which fully protects the article against corrosion and other external degradative forces.

9 Claims, No Drawings

TAPE COATING

BACKGROUND OF THE INVENTION

This application is a continuation in part of copending U.S. Ser. No. 699,052 filed May 13, 1991, now abandoned a continuation-in-part of U.S. Ser. No. 546,471 filed Jun. 28, 1990 (now abandoned) and which in turn is a continuation in part of Ser. No. 403,416 filed Sep. 6, 1989 (now abandoned).

The present invention relates in general to protective coatings for metal tubular objects and specifically to protective coatings for metal pipes intended for inground implantation. Since the invention is particularly directed to protecting inground metal pipelines, it will be discussed hereinafter by reference thereto.

The art is replete with references to protective pipeline coatings which provide varying degrees of resistance to impact, mechanical penetration, storage, indentation, abrasion, soil stresses and cathodic disbondment. Four major categories of protective pipeline coating are presently employed by the pipeline industry. They are:

(1) Hot Applied coal-tar enamel and asphalt mastics in relatively thick layers (100 mils) and commonly reinforced on the outside with glass or asbestos sheets. While such coatings are reported to represent over half of the plant-applied coatings in the United States, the hazards presented by their use foretell a decreasing popularity of this category. Further, the products show poor impact resistance, poor resistance to mechanical penetration, poor abrasion resistance, poor stability to soil stress conditions, and are only deemed fair in regard to indentation resistance, pipe bending, cathodic disbonding and resistance to hydrocarbon solvents.

(2) Extrusion coatings of a thermoplastic resin: (typically 40 mils). In practice, polyethylene has virtually a monopoly in this area. The technique may involve a seamless tubular extrusion over the pipe or a flat die sheet extrusion wrapped around the pipe. In most cases, the polymer is applied to a first-applied mastic layer (e.g. bituminous). These coatings show improved properties in regard to those mentioned above for the Hot-Applied enamel and coal tar coatings except insofar as resistance to hydrocarbon solvents.

(3) Fusion-bonded coatings—A thermoplastic powder is electrostatically applied to hot pipe where it "melts", adheres to the metal and fuses to itself. Only three basic materials have been widely used-polyethylene, vinyl and epoxy powders with only the latter enjoying commercial success in the United States. Chemically, these are, generally, bisphenol polymers with epoxy end groups.

The epoxies require a thermal curing to the thermoset form and usually a catalyst is used in the system (e.g. amines, acids, boron halides, etc.). Often times a liquid epoxy primer is used prior to the powder coating. Typically epoxy coatings have been 12–14 mils in thickness to provide proper coverage, although in M. D. Simpson's paper "External Protection of Steel Pipes Using Epoxy Powder Coatings" (contribution SI) presented at the Second International Conference on the Internal and External Protection Pipes (in England September 1977) he states (page X2)

"Bitumen coal tar and polyethylene are required to be applied relatively thick, but epoxy powder coatings give excellent protection with only 3 mm of coatings."

Apparently and obviously "3 mm" should be $-0.3$ MM-(12 mils). However, epoxy powder coatings still have inherent disadvantages, e.g. brittleness and lack of flexibility and stresses at the pipe-epoxy interface.

In order to effect a satisfactory epoxy coating which would have satisfactory resistance to impact, mechanical penetration, indentation, abrasion, soil stresses, and cathodic disbondment it has been accepted that about a 12–14 mil thickness coating is required, which is very costly to produce.

(4) Tape Coating Systems (typically 20–80 mils thick) This method entails spirally wrapping a corrosion protective tape, referred to in the art as the innerwrap, around a rubber based primer coating, followed by applying a second plastic outerwrap tape in a similar fashion as the innerwrap.

Many improvements on this tape coating system involving an inner and an outerwrap, have been advanced all of which have at their essence the primary task of promoting a tight bond thereby creating a coating which insulates the pipe from degradative external forces.

Accordingly, some tapes comprise polyethylene backings with a pressure-sensitive adhesives, or primer-activated adhesive coating thereon. The properties exhibited by these pipe coatings are similar to those of extrusion coated pipe coatings.

U.S. Pat. No. 4,213,486 issued to Samour et al. and assigned to the present assignee, discloses a polyethylene outerwrap carrying a means for effect bonding to the innerwrap epoxy layer wherein the means may be a hot melt adhesive or a pressure-sensitive adhesive. U.S. Pat. No. 3,874,418 issued to Hielema and assigned to the present assignee discloses:

"A method of coating a pipe and a pipe coated thereby, said method comprising the steps of progressively spirally winding a corrosion protective adhesive coated plastic tape onto the outer surface of the pipe with a spiral overlap, covering the coated pipe by progressively winding a film thereon with a predetermined overlap, and, as the film is wound onto the coated pipe, introducing and distributing under pressure a hot melted adhesive into intimate contact with the surface of the marginal portion of the trailing edge of the film and the surfaces of the overlapped portion along the leading edge thereof and of the portion of the tape immediately adjacent the leading edge of the film"

Still a further advancement in the art of tape coat systems is disclosed in U.S. Pat. No. 4,806,400 issued to Sancaktar and assigned to the present assignee, wherein the improvement consists of tapering the opposed edges of the tape to enhance a tighter closure by being less subject to soil stress.

While all the aforementioned tape coat systems provide for useful protective coatings, they still comprise separate layers which do not provide the optimum tight, mechanically tough barrier against external degradative forces such as moisture and oxygen which can cause corrosion.

Accordingly, the task of the present invention can be described as being directed to providing a tape pipe-wrap system affording improved protection against degradative external forces over that obtainable with prior systems such as those mentioned above.

BRIEF DESCRIPTION OF THE INVENTION

In accordance with the present invention, the aforementioned task is solved in a simple and elegant manner by providing a novel tape wrap system wherein a polymeric innerwrap and a polymeric outerwrap are fused together on the pipe by heat to form, after cooling, a uniform, continuous and completely closed coating providing maximum protection against corrosion and other external degradative forces.

DETAILED DESCRIPTION OF THE INVENTION

As mentioned previously, the present invention relates in general to protective coatings of metal tubular objects and is particularly denoted to protective tape coatings, for inground metal pipes.

The novel tape wrap system of this invention consists of what may be regarded as a three-component system, the first being a primer coating applied to the surface of the pipe, the second being an innerwrap applied over the primer coating, and the third being an outerwrap applied over the innerwrap in the manner to be described in detail hereinafter.

The primer coating, which may be any of the per se known primers, e.g. the rubber-based primers heretofore employed as pipe coatings and described in the patent literature, preferably comprises a "KRATON" (trademark of Shell Chemical Company for a di- or tri-block polymer.

The primer coating provides better adhesion at both the pipe/primer interface and the innerwrap/primer interface and also serves to coat any irregularities which may be present on the pipe surface.

A particularly preferred primer coating for use with the present invention is one of the type described and claimed in the copending application of Mildred C. Richards, Ser. No. 537,390, filed Jun. 12, 1990 including a thermoplastic rubber, e.g. a triblock of the KRATON series having polymerizable anhydrides appended or bonded to the polymeric backbone; a cathodic disbondment inhibitor, preferably an amphipathic metal complexing disbondment inhibitor as disclosed in U.S. Pat. No. 5,108,809; and preferably also a tackifier such as a rosin ester.

The innerwrap may be a three-layer structure designated for simplicity of discussion as A/B/C, wherein layer A consists essentially of a heat-fusible material; layer B consists essentially of a polyolefin material; and layer C consists essentially of an adhesive layer for adhering the innerwrap to the primer; or, alternatively a two-layer structure AB/C wherein layer AB is a blend of A and B and A,B and C have the meanings heretofore given.

Suitable adhesives include any of the known natural or synthetic rubber-based pressure-sensitive adhesives heretofore employed for pipewraps.

Since the patent literature is replete with reference to such materials, their selection will be a matter of individual choice and accordingly per se comprise no part of this invention. Accordingly, they need not be discussed in more detail other than to note, by way of illustration that they may comprise butyl rubber in combination with the known tackifiers providing the requisite aggressive adhesion. Thermosetting adhesives may also be used, if desired.

The outerwrap consists of a three-layer construction again designated for simplicity of discussion as $A/B^1/A$ or alternatively, two layer construction $A/B^1$ wherein A, as heretofore mentioned, is a heat-fusible material and $B^1$ is an impact-resistant polyolefin.

Suitable heat fusible materials (A) include ethylene vinyl acetate (EVA), ethyl methyl acrylate (EMA), and low density polyethylene (LDPE), EVA being particularly preferred.

The impact resistant material ($B^1$) comprises a polyolefinic material, preferably polyethylene, and most preferably a mixture of low density polyethylene (LDPE) and high density polyethylene (HDPE).

In the innerwrap, the heat-fusible material (A) may be on the order of from about 0.5 to about 10.0 mils thick; the polyolefin material (B) from about 5.0 to about 30.0 mils thick; and the adhesive (C) from about 2.0 to about 20.0 mils thick or thicker.

With respect to the outerwrap, in the 3-layer system as heretofore noted each (A) layer may be on the order of from about 0.5 to about 10.0 mils thick; and layer (B) from about 5.0 to about 30.0 mils thick or thicker.

In a less preferred embodiment of this invention, it is postulated that the outerwrap may comprise a single layer comprising an AB blend on the order of from about 15 to about 30 mils thick or thicker.

The innerwrap and outerwrap of this invention may be prepared by known coating techniques such as calendering, extrusion and co-extrusion. The selected process will be a matter of individual choice.

It will be appreciated that both the inner- and the outerwrap may, if desired, contain additional ingredients performing specific desired functions. As illustrations of such additives mention may be made of fillers such as carbon black, zinc oxide, clays, chalk, whitings, calcium silicate, barium sulfate and the like in order to reduce the cost, increase the specific gravity, and/or to raise the visocity, plasticizers and softeners such as mineral oil, lanolin, etc.; antioxidants, e.g. aromatic amine antioxidants, substituted phenols, hydroquinone (p-dihydroxybenzene), etc.; curing agents such as sulfur, organic peroxides and the like; accelerators; sequesting agents; biocides such as bactericides, etc.

The general process of producing the tape wrap system of this invention includes well known plant tape coating methods. By way of illustration, pipe may initially be cleaned by any of the conventional ways known in the art such as by shot or grit blasting and preheated, e.g. to 125°-200° F. Primer is then applied to the pipe by way of well known processes such as spraying or brushing. Next, the A/B/C or AB/C innerwrap is applied by progressively spirally winding the innerwrap onto the outer surface of the pipe while maintaining a marginal overlap. When so applied, the layer C adhesive abuts and is adhered to the primer coating while layer A or the AB blend layer is on the outer surface. Outerwrap $A/B^1/A$, $A/B^1$ or single layer blend $AB^1$ is then applied to cover the coated pipe by progressively winding the tape onto the innerwrap-coated pipe with a predetermined overlap. Next, heat is applied to the coated pipe to attain a tape temperature ranging from about 180° F. to about 325° F. to melt and fuse the heat-fusible materials. Lastly, the pipe is cooled by any of the known methods, exemplary of which is water cooling.

On cooling, the outerwrap is completely heat fused to the innerwrap and to itself at its overlap, thereby forming a uniform, continuous, and completely closed protective coating which fully protects against external degradative forces. More specifically, the ethylene vinyl acetate components namely layers A or the A moiety in blend AB are heat fused, thereby creating a tight bond between the inner and outer wrap so as to achieve essentially a one layer seamless coating. The seamless coating is highly advantageous in that no openings are present which when subjected to external forces create potential portals of entry for pipe corrosion factors. To summarize, the present invention provides for a completely closed internal pipewrap environment which advantageously maintains pipe integrity.

The present invention also has particular application to small pipe segment patching and to welded joints. However, this application requires minor modification in the aforementioned general process.

The following examples show by way of illustration and not by way of limitation the novel tape wrap systems of the present invention.

EXAMPLE I (PRIMER)

In the manner described in the aforementioned application of Richards, Ser. No. 537,390, a primer coating was prepared comprising:

| | |
|---|---|
| Thermoplastic rubber functionalized with maleic anhydride | 100 parts |
| Rosin ester | 100 parts |
| Self-condensation product of do-orthomethylol, p-octyl phenol | 10 parts |
| Toluene | 840 parts |

EXAMPLE II (INNERWRAP)

| Layer | Ingredient(s) | Thickness (mils) |
|---|---|---|
| A | Ethylene Vinyl Acetate (softening point* 59° C.) | 4 |
| B | 64% Low Density Polyethylene 32% High Density Polyethylene 2.5% Black Concentrate 1.0% Antioxidant/Low Density | 11 |
| C | Butyl Rubber Pressure - Sensitive Adhesive | 10 |

*as determined by the American Society for Testing and Material D-1525.

EXAMPLE III (OUTERWRAP)

| Layer | Ingredient(s) | Thickness (mils) |
|---|---|---|
| A | 96% Ethylene Vinyl Acetate (softening point 67° C.) 4% White Concentrate | 4 |
| B | 66-96% High Density Polyethylene 0-30% Low Density Polyethylene 4% White Concentrate | 17 |
| A | 96% Ethylene Vinyl Acetate (softening point 67° C.) 4% White Concentrate | 4 |

A tape wrap prepared by the previously mentioned process and employing primer, inner-and outerwraps in accordance with the previous examples was subjected to Cathodic Disbondment, Impact, and Soil Stress Testing. Prior art commercially available tapes comprising an outerwrap and an innerwrap, each having a polyethylene backing containing a pressure-sensitive rubber based adhesive coating were used as controls.

The following data illustrates the advantageous characteristics of the novel invention and consequently the longevity and integrity of a pipe coated with the novel invention.

TABLE 1

Cathodic Disbondment (inches squared)

| System | Temperature (°F.) | Time (days) | Cathodic Disbondment |
|---|---|---|---|
| Test Sample | 70 | 30 | 0.17 |
| | | 60 | 0.35 |
| | | 90 | 1.1 |
| | 140 | 30 | 2.44 |
| Control | 70 | 30 | 0.9 |
| | | 60 | 1.2 |
| | | 90 | 1.5 |
| | 140 | 30 | 8.0 |

TABLE 2

Impact Strength (inch-pounds)

| System | Temperature (°F.) | Impact Strength |
|---|---|---|
| Test Sample | 0 | 77.1 |
| | 20 | 69.5 |
| | 40 | 67.8 |
| | 70 | 50.0 |
| Control | 70 | 45.0 |

TABLE 3

Soil Stress Resistance (Relative Units)

| System | Level of Severity (°F.) | Soil Stress Resistance Rating |
|---|---|---|
| Test Sample | 90 | None |
| | 110 | None |
| | 130 | None |
| Control | 90 | None |
| | 110 | One Innerwrap Holiday |
| | 120 | Outerwrap Peeled Back |

TABLE 4

Skid Resistance (Relative)

| System | Level of Severity (°F.) | Skid Resistance |
|---|---|---|
| Test Sample | 75 | No Holidays, Slight Wrinkling No Peel Back of Outerwrap |
| Control | 75 | No Holidays, Severe Wrinkling Outerwrap Peelback |

These test results demonstrate the advantageous characteristics and hence resistance to external degradative forces. Specifically, cathodic disbondment is more than 50% decreased at 140° F., which is particularly advantageous give the implantation of pipes in hot temperature regions. The results of impact testing will show an advantage over the control yet the most important soil stress testing shows a highly significant improvement, no peeling of the outerwrap at a level of severity of 130° F. Resistance to soil stress is highly significant since pipeline tape deterioration, corrosion, is mostly caused by soil stress imparted on the inground pipe.

The following example is illustrative of a single layer blend outerwrap.

EXAMPLE IV

| Ingredient | % |
|---|---|
| A - Ethylene vinyl acetate copolymer (softening point 59° C.) | 35 |
| B - Low density polyethylene blend | 59 |
| White concentrate | 5 |

| Ingredient | % |
|---|---|
| Antioxidant | 1 |

From the foregoing description it will be apparent to those skilled in the art of protecting inground pipelines from environmental degradative forces that the present invention provides very substantial advantages over prior systems.

The present invention provides a cost-effective extremely tough wrap for protecting the pipe. Two layers of coating are fused together along with the overlaps and bonded to the pipe, thereby providing a tight, mechanically tough barrier against corrosion and other external degradative forces. While the outerwrap of this invention is characterized as being tough, yet it remains flexible. It contains no adhesive but is instead fused to the innerwrap. Consequently, it won't move, stays intact and it's fused edges cannot turn over.

The novel tape wrap system of this invention has been found to stand up to the most rough challenging conditions at the plant where it is applied to the pipe. After repeated handling during loading and during transportation, it has been found to arrive defect-free at the job site.

An important advantage of this invention is the performance at extreme temperatures. Whether the pipe is laid in the desert or the Arctic, the tapewrap system stays tough and flexible. The edges won't roll over and the system won't move even when pipes shift on skids as the temperature changes.

In-ground, the tape wrap system of this invention is resistant to soil stress, even at the above-mentioned extreme temperatures. In laboratory tests simulating soil stress where the tape wrap is subjected to shear forces at temperatures far above those which damage conventional coatings, no damage or movement is observed.

In summary the present invention, provides in a single coating system every feature needed to lay defect-free pipe that resists corrosion longer than was heretofore though possible.

Since certain changes may be made without departing from the scope of the invention herein described, it is intended that all matter contained in the foregoing description, including the examples, shall be taken as illustrative and not in a limiting sense.

What is claimed is:

1. A three-component tape wrap system adapted for protecting metal pipes intended for inground implantation where they are subjected to cathodic protection comprising: (1) a primer coating for adhering the tape wrap to the outer surface of the pipe and which contains a cathodic disbondment inhibitor; (2) an inner wrap to be spirally wound over the primer coating whereby to provide a marginal overlap; and (3) an outer wrap to be spirally wound over the inner wrap whereby also to provide a marginal overlap, the inner wrap comprising a layer comprising a polyolefinic material having inner and outer opposed surfaces, the inner surface carrying an adhesive layer for adhering the inner wrap to the primer coating, the outer surface carrying a layer comprising a heat-fusible material, and the outer wrap having a layer comprising an impact-resistant polyolefinic material having opposed inner and outer surfaces, and a layer comprising a heat-fusible material carried on each of the inner and outer surfaces of the outer wrap.

2. A tape wrap system as defined in claim 1 wherein each layer of heat-fusible material is from about 0.5 mil to about 10.0 mils thick.

3. A tape wrap system as defined in claim 1 wherein the impact-resistant polyolefinic material of the outer wrap comprises a mixture of low and high density polyethylene.

4. A tape wrap system as defined in claim 1 wherein the adhesive comprises a natural or a synthetic rubber-based pressure-sensitive adhesive.

5. A tape wrap system as defined in claim 1 wherein the primer coating comprises a thermoplastic rubber.

6. A tape wrap system as defined in claim 2 wherein the thermoplastic rubber is a triblock polymer chain having styrene end blocks and an ethylene-butylene or an isoprene mid block.

7. A tape wrap system as defined in claim 6 wherein the polymer chain contains appended polymerizable anhydride substituents.

8. A tape wrap system as defined in claim 1 wherein the cathodic disbondment inhibitor comprises an amphipathic metal complexing material.

9. A tape wrap system as defined in claim 1 wherein the heat-fusible material comprises ethyl methyl acrylate.

* * * * *